(12) United States Patent
Von Novak, III et al.

(10) Patent No.: US 10,671,067 B2
(45) Date of Patent: Jun. 2, 2020

(54) MANAGING LIMITED SAFE MODE OPERATIONS OF A ROBOTIC VEHICLE

(71) Applicant: QUALCOMM Incorporated, San Diego, CA (US)

(72) Inventors: William Henry Von Novak, III, San Diego, CA (US); Vincent Kemler, San Diego, CA (US); Cody Wheeland, San Diego, CA (US); Layne Thomas, Coronado, CA (US); Courtney Cooley, Poway, CA (US); Donald Bolden Hutson, San Diego, CA (US); Mark Caskey, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 15/871,332

(22) Filed: Jan. 15, 2018

(65) Prior Publication Data

US 2019/0220004 A1    Jul. 18, 2019

(51) Int. Cl.
*G05D 1/00* (2006.01)
*H02P 29/028* (2016.01)
(Continued)

(52) U.S. Cl.
CPC .......... *G05D 1/0055* (2013.01); *B60L 3/0084* (2013.01); *B60L 3/12* (2013.01); *B63H 21/21* (2013.01); *B64C 39/024* (2013.01); *B64D 35/00* (2013.01); *B64D 45/00* (2013.01); *G05D 1/0077* (2013.01); *H02P 29/028* (2013.01);
(Continued)

(58) Field of Classification Search
CPC .. G05D 1/0055; G05D 1/0077; B60L 3/0023; B60L 3/0084; B60L 3/0092; H02P 29/024; H02P 29/028
See application file for complete search history.

(56) References Cited

U.S. PATENT DOCUMENTS 9,524,648 B1    12/2016  Gopalakrishnan et al.
9,625,894 B2 *   4/2017  Kamenetz .......... G05B 19/0421
(Continued)

OTHER PUBLICATIONS

International Search Report and Written Opinion—PCT/US2018/066010—ISA/EPO—dated Apr. 4, 2019 12 pages.

*Primary Examiner* — Thomas G Black
*Assistant Examiner* — Sara J Lewandroski
(74) *Attorney, Agent, or Firm* — The Marbury Law Group, PLLC

(57) ABSTRACT

Embodiments include devices and methods for maintaining control of a robotic vehicle when control signals from a main controller are lost. A detector circuit may monitor signals from the main controller to an electronic speed controller (ESC) to detect a loss of valid control signals. The detector circuit may cause an auxiliary controller to begin issuing motor control signals to the ESC in response to detecting a loss of valid control signals. The auxiliary controller may be configured to issue motor control signals to the ESC according to a pre-loaded set of motor control instructions. The pre-loaded set of motor control instructions may be received from the main controller and/or may be configured to cause the auxiliary controller to issue motor control signals to the ESC that control motors in a manner that causes the robotic vehicle to enter a safe mode of operation or execute a particular maneuver.

23 Claims, 9 Drawing Sheets

(51) Int. Cl.
  *B64C 39/02*   (2006.01)
  *B64D 45/00*   (2006.01)
  *B64D 35/00*   (2006.01)
  *B63H 21/21*   (2006.01)
  *B60L 3/00*    (2019.01)
  *B60L 3/12*    (2006.01)
  *B63B 79/00*   (2020.01)

(52) U.S. Cl.
  CPC ........ *B63B 79/00* (2020.01); *B63H 2021/216* (2013.01); *B64C 2201/104* (2013.01); *B64C 2201/108* (2013.01); *B64C 2201/141* (2013.01)

(56) References Cited

U.S. PATENT DOCUMENTS

| | | | | |
|---|---|---|---|---|
| 9,828,107 | B1* | 11/2017 | Ruymgaart | G05D 1/0077 |
| 2002/0116096 | A1* | 8/2002 | Ortega | G05D 1/0077 |
| | | | | 701/4 |
| 2011/0248121 | A1* | 10/2011 | Hirvonen | G05D 1/0077 |
| | | | | 244/194 |
| 2012/0253555 | A1* | 10/2012 | Stange | G05D 1/0055 |
| | | | | 701/3 |
| 2013/0024721 | A1* | 1/2013 | Kabulepa | G06F 11/1641 |
| | | | | 714/5.1 |
| 2013/0067259 | A1* | 3/2013 | Freiwald | G06F 1/3293 |
| | | | | 713/323 |
| 2013/0311009 | A1 | 11/2013 | McAndrew et al. | |
| 2015/0338855 | A1 | 11/2015 | Stark et al. | |
| 2016/0264150 | A1* | 9/2016 | Freiwald | B60W 50/029 |
| 2016/0347462 | A1* | 12/2016 | Clark | B64C 39/024 |
| 2017/0084181 | A1* | 3/2017 | Wilson | G08G 5/0069 |
| 2018/0237148 | A1* | 8/2018 | Hehn | B64D 31/06 |
| 2018/0362168 | A1* | 12/2018 | Clark | B64D 17/62 |
| 2019/0228666 | A1* | 7/2019 | Lassini | G05B 17/02 |

\* cited by examiner

MANAGING LIMITED SAFE MODE OPERATIONS OF A ROBOTIC VEHICLE

BACKGROUND

Robotic vehicles (e.g., "UAVs" or "drones") are configured with increasingly complex hardware and software. Robotic vehicles are controlled by a main controller that handle numerous functions of the robotic vehicle, such as flight control and navigation, processing sensor data (e.g., input from cameras, sonar, gyroscope, accelerometer, etc.), receiving and processing GPS signals, controlling radios for communication, and the like. As the complexity of these components and mission functionality increases, so do the chances of a hardware or software fault causing a "crash" and reboot of the main controller.

The main controller will perform a hard restart in the event of a software crash of the main controller. When performing a hard restart, the main controller stops signaling the electronic speed controllers (ESCs) that control the motors for vehicle propulsion, such as motors that drive the vehicle's rotors, wheels, propellers, etc. Thus, during a hard restart, the main controller has no control over vehicle propulsion, which can cause the ESCs to stop powering the rotors, wheels, propellers, etc. causing the robotic vehicle to temporarily go out of control.

SUMMARY

Various embodiments include methods that may be implemented on a processor of a robotic vehicle for maintaining control of the robotic vehicle control when signals from a main controller are lost. Various embodiments may include monitoring, by a detector circuit, control signals from a main controller of the robotic vehicle to an electronic speed controller (ESC) to detect a loss of valid control signals to the ESC, and causing an auxiliary controller to begin issuing motor control signals to the ESC for controlling one or more motors to maintain control of the robotic vehicle in response to detecting a loss of valid control signals to the ESC.

In some embodiments, causing an auxiliary controller to begin issuing motor control signals to the ESC in response to detecting loss of valid control signals from the main controller to the ESC may include disconnecting a first signal path that couples the main controller to the ESC and connecting a second signal path that couples the auxiliary controller to the ESC.

Some embodiments may further include determining whether the main controller is capable of resuming sending valid control signals to the ESC, and causing the auxiliary controller to stop sending motor control signals to the ESC in response to determining that the main controller is capable of resuming sending valid control signals to the ESC. In such embodiments, determining whether the main controller is capable of resuming sending valid control signals to the ESC may include detecting that the main controller has completed a reboot process.

In some embodiments, the auxiliary controller may be configured by motor control instructions stored in memory to issue motor control signals to the ESC for controlling one or more motors to maintain control of the robotic vehicle. In such embodiments, the motor control instructions stored in memory may configure the auxiliary controller to issue motor control signals to the ESC for controlling one or more motors to cause the robotic vehicle to assume a safe mode of operation.

Some embodiments may further include receiving, by the auxiliary controller, motor control instructions from the main controller prior to the loss of valid control signals, and storing, by the auxiliary controller, the received motor control instructions in memory. In such embodiments, the motor control instructions received from the main controller may configure the auxiliary controller to issue motor control signals to the ESC for controlling one or more motors to cause the robotic vehicle to maintain an attitude, direction or speed of the robotic vehicle prior to the loss of valid control signals.

In some embodiments, issuing, by the auxiliary controller, motor control signals to the ESC for controlling one or more motors to maintain control of the robotic vehicle may include executing a set of motor control instructions for issuing motor control signals to the ESC for controlling one or more motors to cause the robotic vehicle to perform a maneuver, determining whether the set of motor control instructions have been completed, and issuing motor control signals to the ESC for controlling one or more motors to cause the robotic vehicle to assume a safe mode of operation in response to determining that the set of motor control instructions has been completed. Such embodiments may further include initializing a timer upon detecting a loss of valid control signals to the ESC, determining whether the timer has elapsed in response to determining that the set of motor control instructions have not been completed, and issuing motor control signals to the ESC for controlling one or more motors to cause the robotic vehicle to assume a safe mode of operation in response to determining that the timer has elapsed.

Some embodiments may further include performing a test of the auxiliary controller, determining whether a fault in the auxiliary controller is detected, and taking an action to protect the robotic vehicle in response to detecting a fault in the auxiliary controller.

Further embodiments may include a robotic vehicle having at least one motor, an ESC coupled to the motor, a main controller, a detector circuit and an auxiliary controller in which the detector circuit and auxiliary controller are configured to perform operations of the methods described above. In some embodiments, the detector circuit may be included in the auxiliary controller. In some embodiments, the auxiliary controller may be included in the ESC. Further embodiments may include an auxiliary controller for use in a robotic vehicle configured to perform operations of the methods described above. Further embodiments may include a robotic vehicle including means for performing functions of the methods described above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
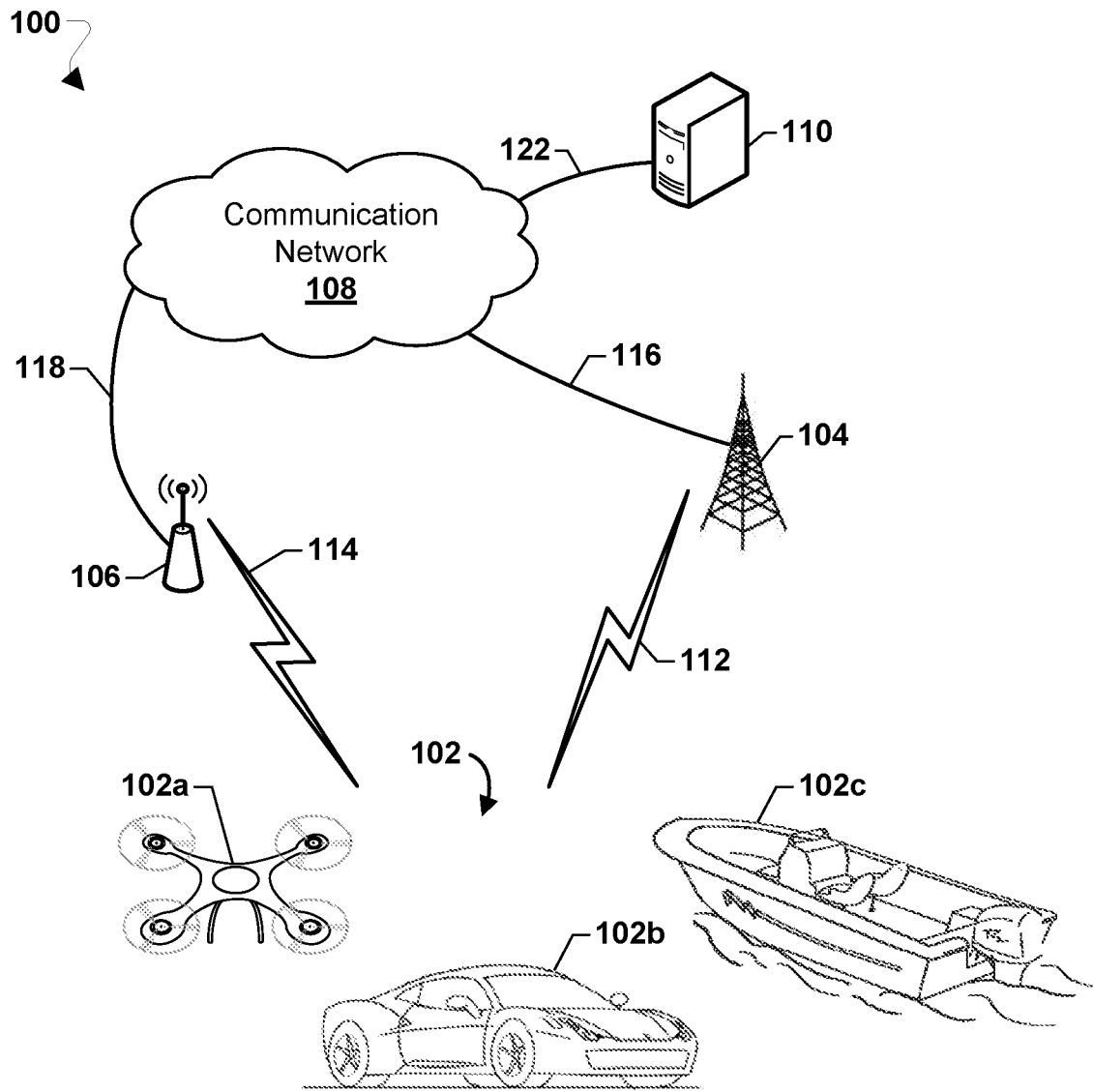
FIG. 1 is a system block diagram of a robotic vehicle operating within a communication system suitable for use with various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments improve the functions and reliability of robotic vehicles by providing a distributed, limited-function auxiliary controller that is configured to maintain stable operation of a robotic vehicle by issuing motor control signals to the ESCs for a limited amount of time in the event that a robotic vehicle's main controller stops sending control signals to the ESCs. By issuing motor control signals to the ESCs configured to cause the robotic vehicle to assume a safe or stable operating configuration, robotic vehicles can be protected from damage or loss while the main controller completes a full restart and regains control of the ESCs.

The main controller of a robotic vehicle is typically a robust processing device capable of controlling numerous functions of the robotic vehicle, such as flight control and navigation, processing sensor data (e.g., input from cameras, sonar, gyroscope, accelerometer, etc.), receiving and processing GPS signals, controlling radios for communication, and the like. The main controller may include a robust processor with memory, data interfaces, avionics sensors and processors, and other components configured to monitor and control various components and functionality of the robotic vehicle. The main controller may be implemented as a "system-on-chip" (SOC), which is a set of interconnected electronic circuits within a single package or assembly typically, but not exclusively, including one or more processors, a memory, a communication interface, and a storage memory interface. Robotic vehicles leverage the capabilities of such a main controller by including increasingly complex hardware components and software-based functionality. As the complexity of robotic vehicle components and functionality increases, so does the likelihood of a hardware or software fault requiring a reboot of the main controller.

The consequences of an unscheduled main controller reboot during operation are potentially catastrophic to a robotic vehicle because control signals to various components are interrupted while the processor performs a hard restart of the main processor and other components. In particular, a hard restart of the main controller interrupts control signals to the ESCs that control the motors drive the vehicle's rotors, wheels, or propellers for vehicle propulsion, and maneuvering (e.g., flight control). When control signals to the ESCs are interrupted, the motors stop, which may lead to loss of control of the robotic vehicle, potentially causing the robotic vehicle to collide with nearby objects or crash. Thus, even though the main controller remains functional after completing a reboot, the robotic vehicle may be disabled or lost.

Various embodiments provide components, methods and systems of controlling one or more motors of a robotic vehicle in the event of a loss of valid control signals from the main controller. Various embodiments are applicable to a variety of robotic vehicles, including autonomous road vehicles, submersible vehicles, and aerial vehicles (fixed wing and rotorcraft). In some embodiments, the robotic vehicle may be provided with one or more small auxiliary controllers coupled to or associated with each ESC and configured to take over control of the ESCs in the event that the main controller stops sending control signals (e.g., in the event of a main controller hard restart or failure). The auxiliary controller(s) is/are less powerful than the main controller, and may be configured to provide limited "safe mode" control of the associated ESCs sufficient to maintain limited maneuvering control over the robotic vehicle.

In some embodiments, a detector circuit associated with the ESCs may detect when the main controller has stopped sending control signals to the ESCs. In some embodiments, the detector circuit may be configured to detect a loss of valid control signals from the main controller. In some embodiments, the detector circuit may be configured to detect when the main controller is sending invalid control signals to the ESC, such as control signals including values that are out of range (e.g., is a corrupted or gibberish signal). In some embodiments, the detector circuit may be configured to detect a loss of a heartbeat signal from the main controller, in which the heartbeat signal indicates that the main controller is operating normally. In various embodiments, the detector circuit may be implemented in hardware, software, or a combination of hardware and software.

In various embodiments, the detector circuit may control the auxiliary controller to take control of (i.e., send control signals to) its associated ESC in response to detecting that the main controller has stopped sending control signals to the ESCs. In some embodiments, the detector circuit may switch signal paths from connecting the main controller with each ESC to connecting each respective ESC with its auxiliary controller.

In some embodiments, the auxiliary controller may provide control signals to its associated ESC to maintain a "safe mode" of operation of the robotic vehicle. In some embodiments, the auxiliary controller may be configured to assume control of its ESC for a short period of time while the main controller reboots (e.g., performs a hard restart). In some embodiments, the safe mode of operation may include the auxiliary controller controlling its associated ESC to perform limited safe mode operations. Examples of the limited safe mode operations may include hovering for an aerial robotic vehicle, slowly ascending for a submersible robotic vehicle, and holding the last known steering angle for an autonomous road robotic vehicle.

In some embodiments, the auxiliary controller may issue control signals that replicate a limited set of motor control instructions previously received from the main controller. For example, during normal operations the auxiliary controller may periodically monitor and store a small set of motor control instructions from the main controller (e.g., instructions for the next 10-15 seconds), so that the axillary controller can issue control signals to the ESC that will cause the robotic vehicle to continue along a previous course.

In some embodiments, the auxiliary controller may issue control signals that replicate a limited set of pre-loaded motor control instructions, which may be factory pre-loaded (e.g., instructions to maintain a stable hover) or a set of motor control instructions periodically received from the main controller (e.g., instructions to fly in a certain manner). In some embodiments, the limited set of pre-loaded motor control instructions may go beyond a single instruction or single mode of operation, and may include a set of two or more motor control instructions. In some embodiments, the limited set of pre-loaded motor control instructions may include optional maneuvers, such as maneuvers to be performed in response to determining a particular environmental condition and/or condition of the robotic vehicle.

In some embodiments, the auxiliary controller may issue motor control instructions to execute the limited safe mode operations and/or to execute the limited set of pre-loaded motor control instructions alone or in some combination. For example, the auxiliary controller may perform one or more aspects of the limited set of pre-loaded motor control instructions for period of time (e.g., such as 10-15 seconds of the instructions), and then the auxiliary controller may switch (e.g., "fall back") to performing the limited safe mode operation.

In some embodiments, the detector circuit may detect that the main controller is capable of resuming control of the ESCs. In some embodiments, the detector circuit may monitor the main controller's reboot process, and may detect when the main controller has completed its reboot process (e.g., that the main controller has come back online). In some embodiments, the detector circuit may detect a control signal from the main controller (e.g., a resumption of the control signal from the main controller). In some embodiments, in response to detecting that the main controller is capable of resuming control of ESCs, the detector circuit may control the auxiliary controller to relinquish control of each ESC. In some embodiments, in response to detecting that the main controller is capable of resuming control of ESCs, the detector circuit may reconnect the signal paths between the main controller and each ESC.

Various embodiments may be implemented within a robotic vehicle operating within a variety of communication systems 100, an example of which is illustrated in FIG. 1. With reference to FIG. 1, the communication system 100 may include a robotic vehicle 102, a base station 104, an access point 106, a communication network 108, and a network element 110.

The base station 104 and the access point 106 may provide wireless communications to access the communication network 108 over a wired and/or wireless communication backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may be configured to provide wireless communications over a relatively smaller area. Other examples of base stations and access points are also possible.

The robotic vehicle 102 may include any of a variety of robotic vehicles, for example, an aerial robotic vehicle 102a, a ground robotic vehicle 102b, and a watercraft robotic vehicle 102c. Other examples are also possible. The robotic vehicle 102 may communicate with the base station 104 over a wireless communication link 112 and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The robotic vehicle 102 and the network element 110 may communicate via the communication network 108. The network element 110 may provide the robotic vehicle 102 with a variety of information, such as navigation information, weather information, information about environmental conditions, movement control instructions, and other information, instructions, or commands relevant to operations of the robotic vehicle 102.

Figure 2:
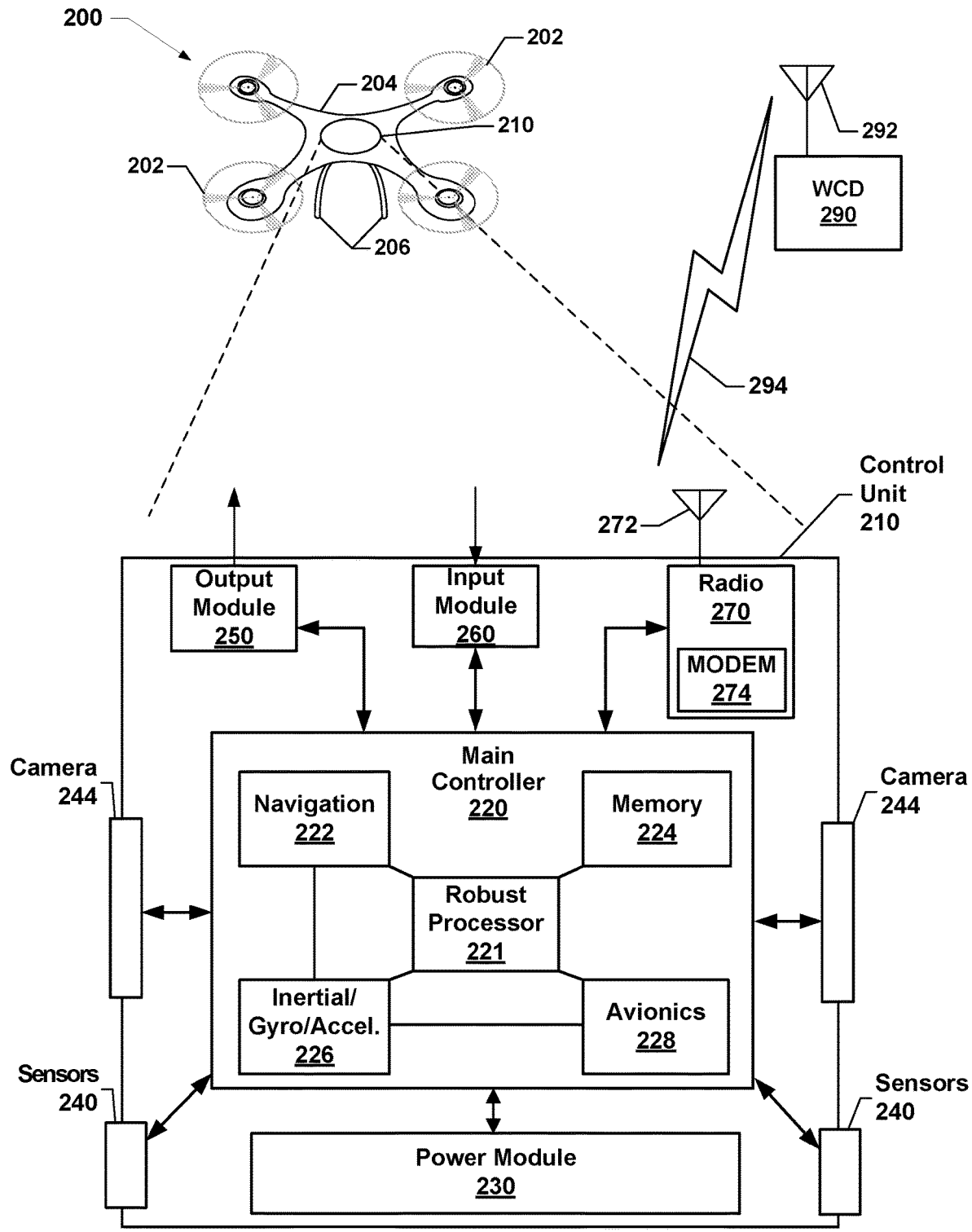
FIG. 2 is a component block diagram illustrating components of a robotic vehicle suitable for use with embodiments.

In various embodiments, a robotic vehicle may include winged or rotorcraft varieties of aerial robotic vehicles. FIG. 2 illustrates an example of an aerial robotic vehicle 200 that utilizes multiple rotors 202 driven by corresponding motors to provide lift-off (or take-off) as well as other aerial movements (e.g., forward progression, ascension, descending, lateral movements, tilting, rotating, etc.). The robotic vehicle 200 is illustrated as an example of a robotic vehicle that may utilize various embodiments, but is not intended to imply or require that various embodiments are limited to aerial robotic vehicles or rotorcraft robotic vehicles. Various embodiments may be used with winged robotic vehicles, land-based autonomous vehicles, and water-borne autonomous vehicles.

With reference to FIGS. 1 and 2, the robotic vehicle 200 may be similar to the robotic vehicle 102. The robotic vehicle 200 may include a number of rotors 202, a frame 204, and landing columns 206 or skids. The frame 204 may provide structural support for the motors associated with the rotors 202. The landing columns 206 may support the maximum load weight for the combination of the components of the robotic vehicle 200 and, in some cases, a payload. For ease of description and illustration, some detailed aspects of the robotic vehicle 200 are omitted such as wiring, frame structure interconnects, or other features that would be known to one of skill in the art. For example, while the robotic vehicle 200 is shown and described as having a frame 204 having a number of support members or frame structures, the robotic vehicle 200 may be constructed using a molded frame in which support is obtained through the molded structure. While the illustrated robotic vehicle 200 has four rotors 202, this is merely exemplary and various embodiments may include more or fewer than four rotors 202.

The robotic vehicle 200 may further include a control unit 210 that may house various circuits and devices used to power and control the operation of the robotic vehicle 200. The control unit 210 may include a main controller 220, a power module 230, sensors 240, one or more cameras 244, an output module 250, an input module 260, and a radio 270.

The main controller 220 may include a robust processor 221 configured with processor-executable instructions to control maneuvering and other operations of the robotic vehicle 200. The robust processor 221 may be a multi-core processor or multi-processor assembly. The main controller 220 may also include (e.g., as an SOC) or be coupled to a navigation unit 222, a memory 224, an inertial sensor/gyro/ accelerometer unit 226 (which may include an accelerometer, a gyroscope, a magnetometer, an inertial measurement unit, and other similar components), and an avionics module 228, all coupled to the robust processor 221. The main controller 220 and/or the navigation unit 222 may be configured to communicate with a server through a wireless connection (e.g., a cellular data network) to receive data useful in navigation, provide real-time position reports, and assess data.

The avionics module 228 may be coupled to the robust processor 221 and/or the navigation unit 222, and may be configured to provide maneuvering control-related information such as altitude, attitude, airspeed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the robotic vehicle 200 that may be used in navigation and positioning calculations, as well as providing data used in various embodiments for processing images.

The main controller 220 may further receive additional information from the sensors 240, such as an image sensor or optical sensor (e.g., a sensor capable of sensing visible light, infrared, ultraviolet, and/or other wavelengths of light). The sensors 240 may also include a radio frequency (RF) sensor, a barometer, a humidity sensor, a sonar emitter/ detector, a radar emitter/detector, a microphone or another acoustic sensor, a lidar sensor, a time-of-flight (TOF) 3-D camera, or another sensor that may provide information usable by the main controller 220 for movement operations, navigation and positioning calculations, and determining environmental conditions. The sensors 240 may also include one or more sensors configured to detect temperatures generated by one or more components of the robotic vehicle, such as thermometers, thermistors, thermocouples, positive temperature coefficient sensors, and other sensor components.

The power module 230 may provide power to various components, including the main controller 220, the sensors 240, the one or more cameras 244, the output module 250, the input module 260, and the radio 270. In addition, the power module 230 may include energy storage components, such as rechargeable batteries. The main controller 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The main controller 220 may be coupled to the output module 250, which may output control signals for managing the motors that drive the rotors 202 and other components.

The robotic vehicle 200 may be controlled through control of the individual motors of the rotors 202 as the robotic vehicle 200 progresses toward a destination. The main controller 220 may receive data from the navigation unit 222 and use such data in order to determine the present position and orientation of the robotic vehicle 200, as well as the appropriate course towards the destination or intermediate sites. In various embodiments, the navigation unit 222 may include a GNSS receiver system (e.g., one or more global positioning system (GPS) receivers) enabling the robotic vehicle 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other robotic vehicles, etc.

The radio 270 may be configured to receive navigation signals, such as signals from aviation navigation facilities, etc., and provide such signals to the robust processor 221 and/or the navigation unit 222 to assist in robotic vehicle navigation. In various embodiments, the navigation unit 222 may use signals received from recognizable RF emitters (e.g., AM/FM radio stations, Wi-Fi access points, and cellular network base stations) on the ground.

The navigation unit 222 may include a planning application that may perform calculations to plan a path of travel for the robotic vehicle within a volumetric space ("path planning"). In some embodiments, the planning application may perform path planning using information including information about aspects of a task to be performed by the robotic vehicle, information about environmental conditions, an amount of heat that may be generated by one or more components of the robotic vehicle in performing the task, as well as one or more thermal constraints.

The radio 270 may include a modem 274 and a transmit/ receive antenna 272. The radio 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the robotic vehicle 200 may communicate (such as the network element 110). The main controller 220 may establish a bi-directional wireless communication link 294 via the modem 274 and the antenna 272 of the radio 270 and the wireless communication device 290 via a transmit/ receive antenna 292. In some embodiments, the radio 270 may be configured to support multiple connections with different wireless communication devices using different radio access technologies.

In various embodiments, the wireless communication device 290 may be connected to a server through intermediate access points. In an example, the wireless communication device 290 may be a server of a robotic vehicle operator, a third-party service (e.g., package delivery, billing, etc.), or a site communication access point. The robotic vehicle 200 may communicate with a server through one or more intermediate communication links, such as a wireless telephony network that is coupled to a wide area network (e.g., the Internet) or other communication devices. In some embodiments, the robotic vehicle 200 may include and employ other forms of radio communication, such as mesh connections with other robotic vehicles or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera 244 or sensor, or may receive electronic signals from other components (e.g., a payload).

While various components of the control unit 210 are illustrated as separate components, some or all of the components (e.g., the main controller 220, the output module 250, the radio 270, and other units) may be integrated together in a single device, circuit board or module, such as an SOC.

Figure 3:
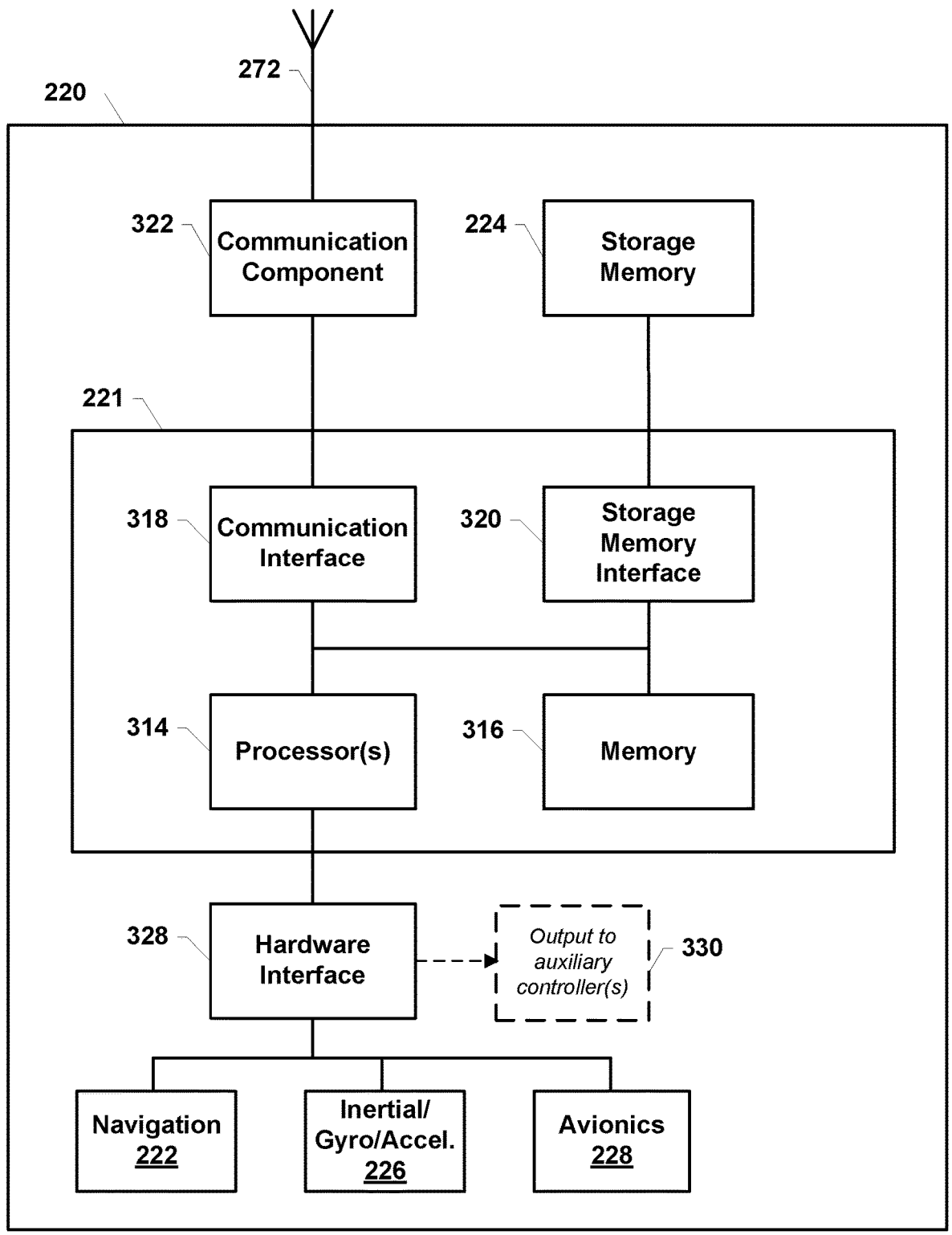
FIG. 3 is a component block diagram illustrating components of a controller suitable for use with robotic vehicles.

FIG. 3 illustrates further components within a robotic vehicle main controller 220 integrated as an SOC. With reference to FIGS. 1-3, a robust processor 221 within the main controller 220 may include a one or more processors or processor cores 314, a working memory 316, a communication interface 318, and a storage memory interface 320. The storage memory interface 320 may be configured to enable the processors 314 to store data to and retrieve data from a storage memory 224, which may be integrated within the main controller 220 SOC as illustrated or connected as a separate component. The main controller 220 configured as an SOC may include a communication component 322, which may integrate a radio 270 with a wireless modem 274, that is configured to connect to an antenna 272 for establishing a wireless communication link, and/or the like.

The main controller 220 integrated as an SOC may further include a hardware interface 328 configured to enable the robust processor 221 to interface with the navigation module 222, inertial sensor/gyroscope/accelerometer module 226, and avionics module 228, as well as communicate with and control various components of a robotic vehicle. In some embodiments, the hardware interface 328 may also provide an output 330 from the navigation module 222, inertial sensor/gyroscope/accelerometer module 226, and/or avionics module 228 to an auxiliary controller, as further described below. The output 330 to the auxiliary controller from the navigation module 222, inertial sensor/gyroscope/accelerometer module 226, and/or avionics module 228 may be independent of the robust processor 221, such that the auxiliary controller may receive data from the navigation module 222, inertial sensor/gyroscope/accelerometer module 226, and/or avionics module 228 even if the robust processor 221 stops sending control signals. In some embodiments, the robust processor 221 may send via the output 330 to the auxiliary controller(s) periodic updates of a limited set of motor control instructions, as further described below.

The robust processor 221 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The robust processor 221 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The main controller 220 may include more than one robust processor 221, thereby increasing the number of processors 314 and processor cores within the main controller 220. The main controller 220 may also include other processors (not shown) that are not within the robust processor 221. The one or more processors 314 may each be configured for specific purposes that may be the same as or different from other processors 314 of the robust processor 221 or main controller 220 SOC. One or more of the processors 314 and processor cores of the same or different configurations may be grouped together.

The working memory 316 of the robust processor 221 may be a volatile or non-volatile memory configured for storing data and processor-executable instructions for access by the processor 314. The main controller 220 and/or robust processor 221 may include one or more storage memories 224 configured to store data for various purposes, including mission-related data (e.g., video data, navigation maps, mission planning, etc.). The working memory 316 may include volatile memories such as random access memory (RAM) or main memory, and cache memory.

Some or all of the components of the main controller 220 and the robust processor 221 may be arranged differently and/or combined while still serving the functions of the various aspects. The main controller 220 and the robust processor 221 may not be limited to one of each of the components, and multiple instances of each component may be included in various configurations.

Figure 4:
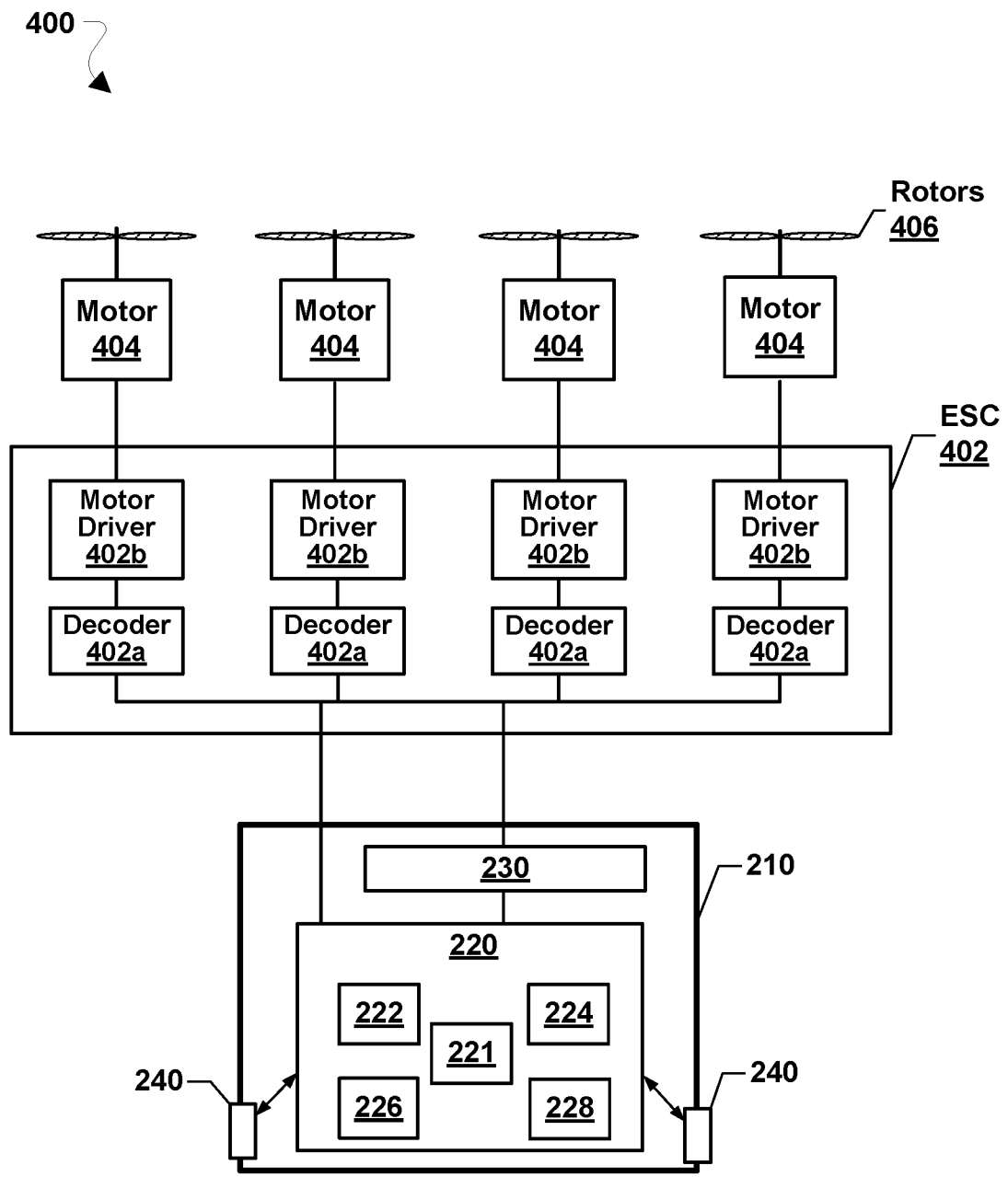
FIG. 4 is a component block diagram illustrating components of a conventional robotic vehicle.

FIG. 4 is a component block diagram illustrating components of a conventional robotic vehicle 400. With reference to FIGS. 1-4, the robotic vehicle 400 may be similar to the robotic vehicles 102, 200. The robotic vehicle 400 is illustrated as an example of a robotic vehicle, but is not intended to imply or require that various embodiments are limited to aerial robotic vehicles or rotorcraft robotic vehicles. Various embodiments may be used with winged robotic vehicles, land-based autonomous vehicles, and water-borne autonomous vehicles.

A conventional robotic vehicle 400 may include a conventional electronic speed controller (ESC) 402 coupled to the control unit 210. The ESC 402 may handle functions including controlling aspects of the operation of each of the rotors 406 by way of the corresponding motors 404. The ESC 402 may be coupled to the power module 230. The power module 230 (e.g., an onboard battery) may be coupled to the motors 404 (e.g., via the ESC 402) and the main controller 220. Each motor 404 may be associated with a respective motor driver 402b and a decoder 402a. Each decoder 402a may decode signals, such as control signals, from the main controller 220 directed to a corresponding motor driver 402b.

The main controller 220 via the ESC 402 may control power to the motors 404 to drive each of the rotors 406. The main controller 220 via the ESC 402 may be used to control individual speeds of the motors 404. The ESC 402 may drive the motors 404 "forward" at differing rotation rates to generate varying amounts of auxiliary thrust, or "backward" to produce varying amounts of mixed aerodynamic forces. Through control of individual motors 404 corresponding to each of the rotors 406, the robotic vehicle 400 may be controlled in flight as the robotic vehicle 400 progresses toward a destination and/or operates in various flight modes.

The main controller 220 is typically a robust processing device capable of controlling numerous functions of the robotic vehicle, such as control of the motors 404 via the ESC 402, as well as other operations including flight control, processing sensor data, receiving and processing GPS signals, controlling radios for communication, and the like. As noted above, the consequences of a main controller failure or reboot during flight operations of an aerial robotic vehicle can be catastrophic because the main controller 220 will stop signaling the ESC 402, causing the ESCs to stop powering the motors 404.

Figure 5:
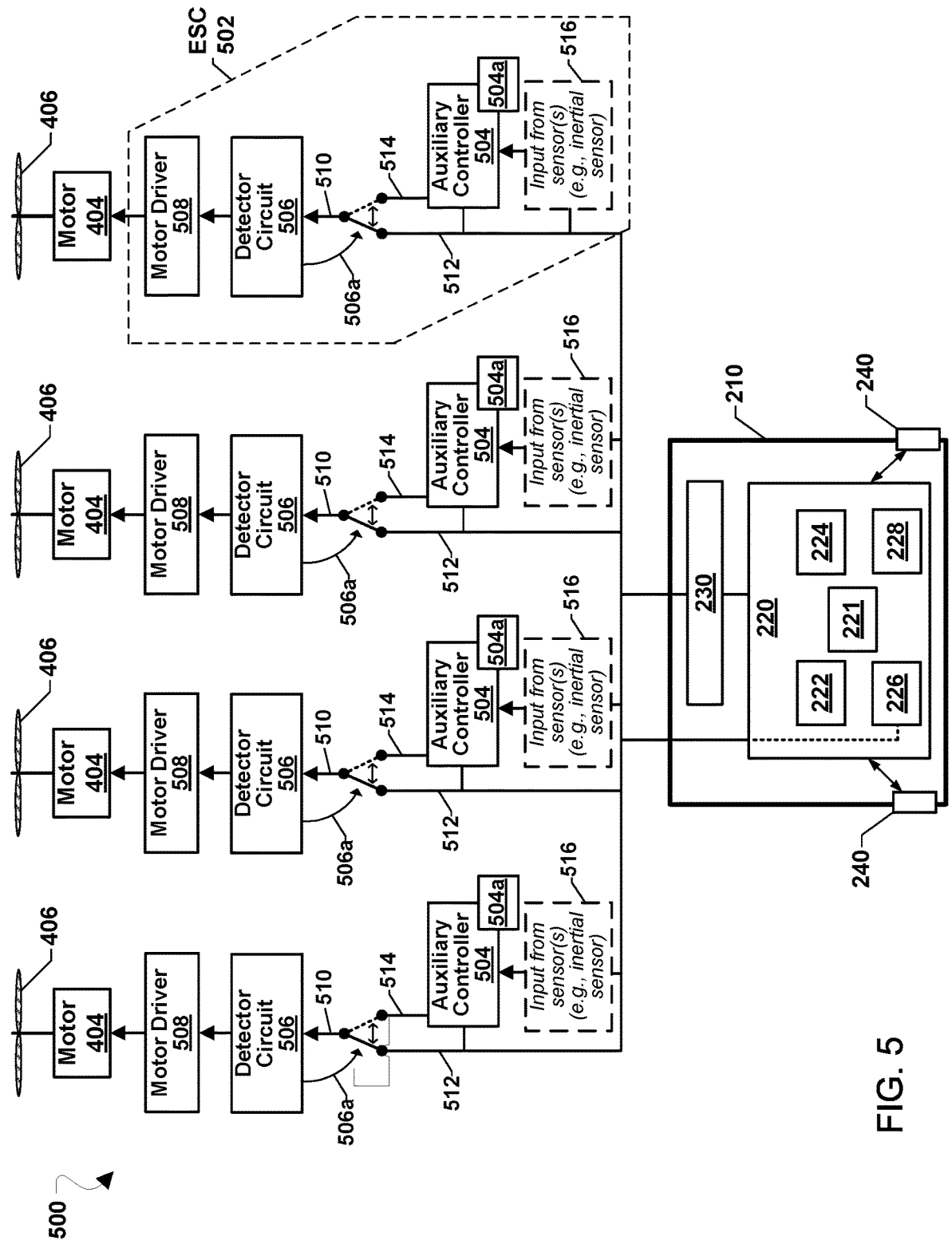
FIG. 5 is a component block diagram illustrating components of a robotic vehicle suitable for use with embodiments.

FIG. 5 is a component block diagram illustrating components of a robotic vehicle 500 according to various embodiments. With reference to FIGS. 1-5, the robotic vehicle 500 may be similar to the robotic vehicles 102, 200. The robotic vehicle 500 is illustrated as an example of a robotic vehicle that may utilize various embodiments, but is not intended to imply or require that various embodiments are limited to aerial robotic vehicles or rotorcraft robotic vehicles. Various embodiments may be used with winged robotic vehicles, land-based autonomous vehicles, and water-borne autonomous vehicles.

In various embodiments, the robotic vehicle 500 may include an ESC 502 coupled to the main controller 220. The ESC 502 may also be coupled to the power module 230 by a path independent of the main controller 220. The ESC 502 may include one or more auxiliary controllers 504, one or more detector circuits 506, and one or more motor drivers 508. The auxiliary controllers 504 may be coupled to a memory 504a. In various embodiments, the detector circuits 506 may be implemented in hardware as a dedicated circuit, in software executing within a processor (which may be a dedicated processor), or a combination of hardware and software (e.g., a detecting circuit that triggers a software-implemented process). For example, the detector circuits 506 may be implemented in processor-executable or controller-executable instructions that may be stored in the memory 504a and executed by the auxiliary controllers 504. As another example, the detector circuits 506 may be implemented in one or more hardware components of the ESC 502. As another example, the detector circuits 506 may be implemented in processor executable instructions stored and executed on an independent hardware component of the ESC 502. Other implementations of the detector circuit 506 are also possible, including variations and/or combinations of the foregoing.

During normal operations, the main controller 220 may provide a stream of control signals to the motors 404 via the motor drivers 508 along a first signal path 512. In some embodiments, the first signal path 512 may couple the main controller 220 to each motor driver 508 via a switch 510 (and, in some embodiments, via the detector circuit 506).

In various embodiments, the detector circuit 506 may monitor the first signal path 512 to detect when the main controller 220 stops controlling the ESC 502 (e.g., as a result of a reboot or failure of the main controller 220). In some embodiments, the detector circuit 506 may be configured to detect a loss of the control signals from the main controller 220. In some embodiments, the detector circuit 506 may be configured to detect when the control signals from the main controller 220 are degraded or are not valid (e.g., exceed a threshold level of an error rate). In such embodiments, the detector circuit 506 may be configured to detect that the main controller 220 has stopped sending valid control signals. In some embodiments, the detector circuit 506 may be configured to detect when the control signals from the main controller 220 include values that are out of range (e.g., is a corrupted or gibberish signal). In some embodiments, the detector circuit 506 may be configured to detect a loss of the control signals from the main controller 220. In some embodiments, the detector circuit 506 may be configured to detect a loss of heartbeat signals or a similar signal from the main controller 220. In some embodiments, the main controller 220 may send heartbeat signals to indicate that the main controller is operating normally. In various embodiments, the main controller 220 may send such heartbeat signals continuously, periodically, or at one or other time intervals. In some embodiments, the heartbeat signals may be provided separate from ESC control signals.

In various embodiments, in response to detecting that the main controller 220 has stopped sending valid control signals to the ESC 502, the detector circuit 506 may be configured to cause the auxiliary controller 504 to take control of the ESC 502 (i.e., begin issuing motor control signals to the ESC 502). In some embodiments, in response to detecting that the main controller 220 has stopped sending control signals to the ESC 502, the detector circuit 506 may be configured to control a switch 510 (e.g., via a control signal 506a) that changes the first signal path 512 connecting the main controller with each ESC to a second signal path 514 that connects each respective auxiliary controller 504 with its respective motor driver 508 (in some embodiments, via the detector circuit 506). In some embodiments, switching from the first signal path 512 to the second signal path 514 may include disconnecting the first signal path 512 and connecting the second signal path 514 that couples the auxiliary controller 504 to its respective motor driver 508.

In some embodiments, the auxiliary controller 504 may assume limited "safe mode" control of its ESC 502 when the second signal path 514 is connected by the switch 510. In such embodiments, the auxiliary controller 504 may provide motor control signals to the motor driver 508 to achieve the limited safe mode operation. In some embodiments, the safe mode of operation may include the auxiliary controller 504 providing motor control signals to its respective motor driver 508 to achieve the limited safe mode operation. In various embodiments, the limited safe mode control includes substantially less maneuvering control over the robotic vehicle than provided by the main controller. Examples of the limited safe mode operation may include hovering for an aerial robotic vehicle, slowly ascending for a submersible robotic vehicle, or holding the last known steering angle for an autonomous road robotic vehicle. In some embodiments, the auxiliary controller 504 may be configured to provide motor control signals to its motor driver 508 for a short period of time that is long enough to enable the main controller to complete a reboot process (e.g., perform a hard restart).

In some embodiments, the detector circuit 506 may be configured to receive signals from the switch 510. In some embodiments, the detector circuit 506 may be positioned between each switch 510 and its respective motor driver 508, and configured to perform fault monitoring of the signal path 512 from the control unit 210 and the signal path 514 from the auxiliary controller 504. For example, the detector circuit 506 may be disposed between the switch 510 and the motor driver 508 along the signal path. In some embodiments, the detector circuit 506 may monitor a signal path between each switch 510 and its respective motor driver 508, but need not be disposed along that signal path. In such embodiments, when the switch 510 is controlled to connect the second signal path 514, the detector circuit 506 may verify that the auxiliary controller 504 is providing proper motor control signals.

In some embodiments, the auxiliary controller 504 may execute a limited set of motor control instructions previously received from the main controller 220 to continue the trajectory and orientation of the robotic vehicle that existed before the loss of valid control signals from the main controller 220. In some embodiments, the auxiliary controller 504 may execute a limited set of pre-loaded motor control instructions preloaded in memory or received from the main controller 220. The limited set of motor control instructions may be stored in the memory 504a of the auxiliary controller 504. In some embodiments, during normal operations the auxiliary controller 504 may receive and store periodic updates of a limited set of motor control instructions from the main controller 220 (e.g., instructions for approximately 10-15 seconds). In some embodiments, the limited set of pre-loaded motor control instructions may go beyond a single instruction or single mode of operation, and may include a set of two or more motor control instructions. In some embodiments, the limited set of pre-loaded motor control instructions may include motor control signals that will cause the robotic vehicle to perform optional maneuvers, such as maneuvers to be performed in response to determining a particular environmental condition and/or condition of the robotic vehicle.

In some embodiments, the auxiliary controller 504 may issue motor control signals to its motor driver 508 to enable the limited safe mode operation and/or issue the limited set of pre-loaded motor control signals alone or in any combination. For example, the auxiliary controller may issue one or more aspects of the limited set of pre-loaded motor control instructions for period of time (e.g., such as 10-15 seconds of the instructions), and then the auxiliary controller 504 may switch (e.g., "fall back") to issuing motor control signals to the motor driver 508 to cause the robotic vehicle to enter a safe mode operation.

In various embodiments, each auxiliary controller 504 may receive inputs 516 from one or more sensors of the robotic vehicle 500 (e.g., the sensors 240, 226). For example, each auxiliary controller 504 may receive the inputs 516 from an inertial sensor, a gyroscope, and accelerometers (e.g., from the inertial/gyro/accelerometer module 226), or another sensor of the robotic vehicle 500. Each of the auxiliary controllers 504 may use the inputs 516 from the sensors to determine appropriate motor control signals to control its respective motor 404 via its respective motor driver 508. For example, each of the auxiliary controllers 504 may operate independently to generate control signals based on the inputs 516 received from the sensors, and each of the auxiliary controllers 504 may transmit the generated control signal to its respective motor driver 508. In some embodiments, each of the auxiliary controllers 504 may operate independently to control the respective motor driver 508 and motor 404 to achieve the safe mode of operation and/or to execute a limited set of pre-loaded motor control signals. In some embodiments, each of the auxiliary controllers 504 may receive the inputs 516 even if control signals are lost from the main controller 220. In some embodiments, each ESC 502 may include one or more independent sensors (e.g., an inertial sensor, gyroscope, accelerometer, and the like) that may provide the auxiliary controllers 504 with information that the auxiliary controller 504 may use to generate the control signal to its respective motor driver 508.

In some embodiments, the detector circuit 506 may detect that the main controller 220 is capable of resuming control of the ESCs 502. In some embodiments, the detector circuit 506 may monitor the main controller 220 reboot process, and may detect when the main controller 220 has completed its reboot process (e.g., that the main controller has come back online). In some embodiments, in response to detecting that the main controller 220 is capable of resuming control of ESCs 502, the detector circuit 506 may reconnect the first signal path 512 between the main controller 220 and each ESC 502.

Figure 6:
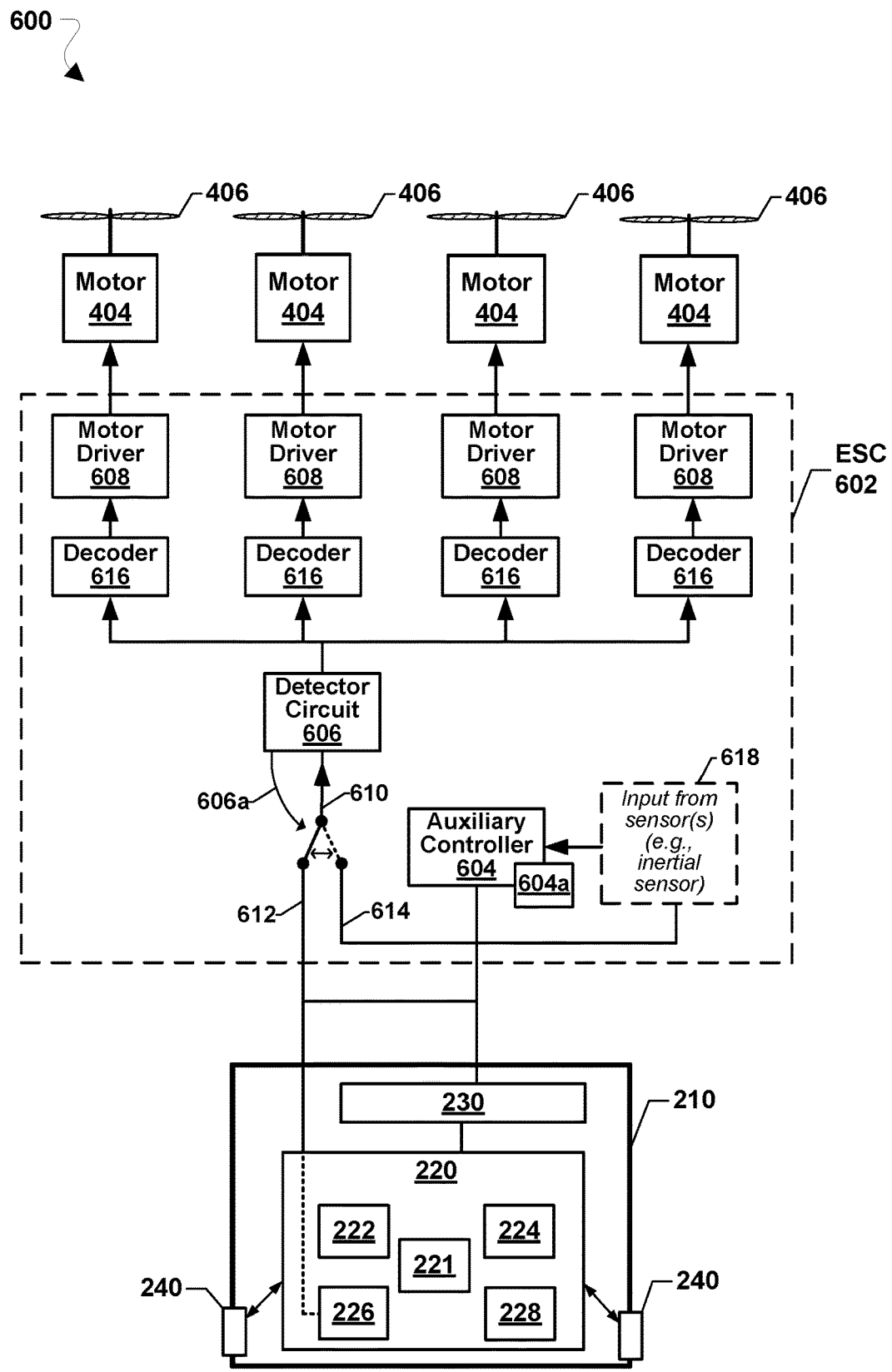
FIG. 6 is a component block diagram illustrating components of a robotic vehicle suitable for use with embodiments.

FIG. 6 is a component block diagram illustrating components of a robotic vehicle 600 according to various embodiments. With reference to FIGS. 1-6, the robotic vehicle 600 may be similar to the robotic vehicles 102, 200. The robotic vehicle 600 is illustrated as an example of a robotic vehicle that may utilize various embodiments, but is not intended to imply or require that various embodiments are limited to aerial robotic vehicles or rotorcraft robotic vehicles. Various embodiments may be used with winged robotic vehicles, land-based autonomous vehicles, and water-borne autonomous vehicles.

In various embodiments, the robotic vehicle 600 may include an ESC 602 coupled to the main controller 220. The ESC 602 may also be coupled to the power module 230 by a path independent of the main controller 220. The ESC 602 may include an auxiliary controller 604, a detector circuit 606, one or more decoders 616 coupled to a respective one or more motor drivers 608. The auxiliary controller 604 may be coupled to a memory 604a. In various embodiments, the detector circuit 606 may be implemented in hardware, software, or a combination of hardware and software. For example, the detector circuit 606 may be implemented in processor-executable or controller-executable instructions that may be stored in the memory 604a and executed by the auxiliary controller 604. As another example, the detector circuit 606 may be implemented in one or more hardware components of the ESC 602. As another example, the detector circuit 606 may be implemented as processor executable instructions stored and executed on an independent hardware component of the ESC 602. Other implementations of the detector circuit 606 are also possible, including variations and/or combinations of the foregoing.

During normal operations, the main controller 220 may provide a series of control signals to the motor drivers 608 via the decoders 616 along a first signal path 612. In some embodiments, the first signal path 612 may couple the main controller 220 to each decoder 616 and each motor driver 608 via a switch 610. Each decoder 616 may decode control signal from the main controller 220 (or the auxiliary controller 604) and provide decoded control signals to its respective motor driver 608. In some embodiments, each decoder 616 may determine whether control signals received from the main controller 220 or the auxiliary controller 604 is intended for its respective motor driver 608.

In various embodiments, the detector circuit 606 may be configured to monitor the first signal path 612 to detect when the main controller 220 stops sending control signals to the ESC 602 (e.g., as a result of a processor reboot or failure of the main controller 220). In some embodiments, the detector circuit 606 may be configured to detect a loss of the control signals from the main controller 220. In some embodiments, the detector circuit 606 may be configured to detect when the control signals from the main controller 220 are degraded or are not valid (e.g., exceed a threshold level of an error rate). In such embodiments, the detector circuit 606 may be configured to detect that the main controller 220 has stopped sending valid control signals. In some embodiments, the detector circuit 606 may be configured to detect when the control signals from the main controller 220 include values that are out of range (e.g., is a corrupted or gibberish signal). In some embodiments, the detector circuit 606 may be configured to detect a loss of the control signal from the main controller 220. In some embodiments, the detector circuit 606 may be configured to detect a loss of heartbeat signals or another similar signal from the main controller 220. In some embodiments, the main controller 220 may provide the heartbeat signals to indicate that the main controller is operating normally. In various embodiments, the main controller 220 may provide the heartbeat signals continuously, periodically, or at one or other time intervals. In some embodiments, the heartbeat signals may be provided separate from one or more other control signals.

In various embodiments, in response to detecting that the main controller 220 has stopped sending valid control signals to the ESC 602, the detector circuit 606 may be configured to control the auxiliary controller 604 to take control of the ESC 602. In some embodiments, in response to detecting that the main controller 220 has stopped sending control signals to the ESC 602, the detector circuit 606 may be configured to control the switch 610 (e.g., via a control signal 606a) to switch from the first signal path 612 connecting the main controller 220 with the ESC 602 to a second signal path 614 that connects the ESC 602 with its auxiliary controller 604. In some embodiments, switching from the first signal path 612 to the second signal path 614 includes disconnecting the first signal path 612 and connecting the second signal path 614 that couples the auxiliary controller 604 with the decoders 616.

In some embodiments, the auxiliary controller 604 may issue motor control signals to the motor drivers 608 (e.g., via each respective decoder 616) that cause each motor 404 to operate in a manner that puts the robotic vehicle into a "safe mode" when the second signal path 614 is connected by the switch 610. In some embodiments, the auxiliary controller 604 may be configured to assume control of the ESC 602 for a short period of time, such as long enough to enable the main controller to complete a reboot (e.g., perform a hard restart). In some embodiments, the auxiliary controller 604 may issue motor control signals to respective decoders 616 to control each of the motor drivers 608 so that the motors operate consistent with limited safe mode operation. As described, limited safe mode operations may include hovering for an aerial robotic vehicle, slowly ascending for a submersible robotic vehicle, or holding the last known steering angle for an autonomous road robotic vehicle. In some embodiments, the auxiliary controller 604 may generate motor control signals for each of the motor drivers 608 independently, thereby achieving independent control of each motor 404 via the respective decoder 616 and motor driver 608. In some embodiments, the auxiliary controllers 604 may receive the inputs 618 even if control signals are lost from the main controller 220. In some embodiments, the 602 may include one or more independent sensors (e.g., an inertial sensor, gyroscope, accelerometer, and the like) that may provide with auxiliary controller 604 with information that the auxiliary controller 604 may use to generate control signals to one or more motor drivers 608.

In some embodiments, the detector circuit 606 may be configured to receive signals from the switch 610. In some embodiments, the detector circuit 606 may be positioned between the switch 610 and the motor driver(s) 608, and configured to perform fault monitoring of the signal path 612 from the control unit 210 and the signal path 614 from the auxiliary controller 604. For example, the detector circuit 606 may be disposed between the switch 610 and the decoder(s) 616 along the signal path. In some embodiments, the detector circuit 606 may monitor a signal path between the switch 610 and the detector circuit 606, but need not be disposed along that signal path. In such embodiments, when the switch 610 is controlled to connect the second signal path 614, the detector circuit 606 may verify that the auxiliary controller 604 is providing motor control signals to the decoder(s) 616.

In some embodiments, the auxiliary controller 604 may execute a limited set of pre-loaded motor control instructions pre-loaded at the factory or received from the main controller 220. The limited set of motor control instructions may be stored in the memory 604a of the auxiliary controller 604. In some embodiments, during normal operations the auxiliary controller 604 may receive and store periodic updates of a limited set of motor control instructions from the main controller 220 (e.g., instructions for approximately 10-15 seconds). In some embodiments, the limited set of pre-loaded motor control instructions may go beyond a single instruction or single mode of operation, and may include a set of two or more motor control instructions. In some embodiments, the limited set of pre-loaded instructions may include motor control signals that will cause the robotic vehicle to continue a maneuver being performed by the robotic vehicle just prior to loss of valid control signals from the main controller. For example, the auxiliary controller 604 may issue motor control signals that cause the robotic vehicle to continue traveling along the path of travel being followed just prior to loss of valid control signals from the main controller. As another example, the auxiliary controller 604 may issue motor control signals that repeat or mimic the motor control signals sent to the ESC just prior to the loss of valid control signals from the main controller, which may result in the robotic vehicle maintaining an attitude, heading and/or a speed while the main controller completes a reboot. In some embodiments, the limited set of pre-loaded motor control instructions may support optional maneuvers, such as maneuvers to be performed in response to determining a particular environmental condition and/or condition of the robotic vehicle (e.g., based on input received from one or more sensors of the robotic vehicle, as further described below).

In some embodiments, the auxiliary controller 604 may issue motor control signals to one or more motor driver 608 via the respective decoder 616 to enable the limited safe mode operation and/or issue the limited set of pre-loaded motor control signals alone or in any combination. For example, the auxiliary controller may issue one or more aspects of the limited set of pre-loaded motor control instructions for a period of time (e.g., such as 10-15 seconds of the instructions), and then the auxiliary controller may switch (e.g., "fall back") to issuing motor control signals to the motor driver(s) 608 via the respective decoder 616 to cause the robotic vehicle to enter a safe mode operation.

In various embodiments, the auxiliary controller 604 may receive inputs 618 from one or more sensors of the robotic vehicle 600 (e.g., the sensors 240, 226), for example, input from an inertial sensor, a gyroscope, and accelerometers (e.g., from the inertial/gyro/accelerometer module 226), or another sensor of the robotic vehicle 600. The auxiliary controller 604 may use the input 618 from the sensors to determine appropriate motor control signals to control each of the motors 404 via its respective motor driver 608. For example, the auxiliary controller 604 may generate different motor control signals for each of the motor drivers 608 based on the input 618, and the auxiliary controller 604 may transmit the generated control signal to its respective motor driver 608 via its respective decoder 616. In some embodiments, the auxiliary controller 604 may independently control each of the motors 404 via the respective decoders 616 and motor drivers 608 to achieve the safe mode of operation and/or to execute the limited set of pre-loaded motor control instructions.

In some embodiments, the detector circuit 606 may detect that the main controller 220 is capable of resuming control of the ESC 602. In some embodiments, the detector circuit 606 may monitor the main controller 220 reboot process, and may detect when the main controller 220 has completed its reboot process (e.g., that the main controller has come back online). In some embodiments, in response to detecting that the main controller 220 is capable of resuming control of ESC 602, the detector circuit 606 may reconnect the first signal path 612 between the main controller 220 and the ESC 602.

Figure 7:
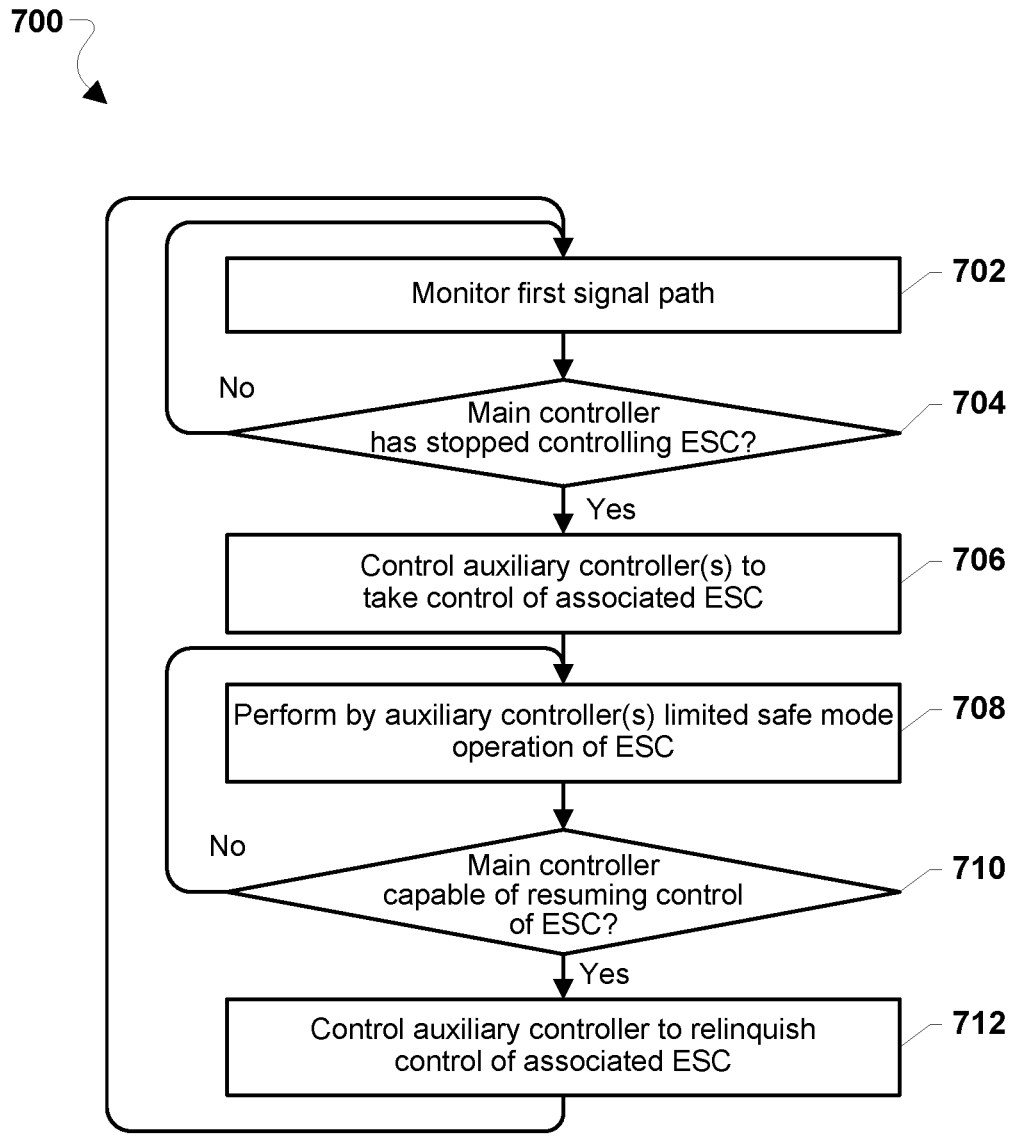
FIG. 7 is a process flow diagram illustrating a method of managing operations of a robotic vehicle according to various embodiments.

FIG. 7 illustrates a method 700 of managing operations of a robotic vehicle, according to various embodiments. With reference to FIGS. 1-7, the method 700 may be implemented in hardware components and/or software components of the robotic vehicle (e.g., 102, 200), the operation of which may be controlled by one or more detector circuits (e.g., 506, 606, and/or the like) and auxiliary controllers (e.g., 504, 604, and/or the like) of the robotic vehicle.

In block 702, the detector circuit may monitor a first signal path (e.g., 512, 612), by which a main controller of the robotic vehicle (e.g., 220) may provide one or more control signals to motors (e.g., 404) via motor drivers (e.g., 508, 608).

In determination block 704, the detector circuit may determine whether the main controller has stopped sending control signals to an ESC (e.g., 502, 602) of the robotic vehicle. In some embodiments, the detector circuit may detect when the main controller stops controlling the ESC, for example, as a result of a reboot or failure of the main controller.

In response to determining that the main controller has not stopped sending control signals to the ESC (i.e., determination block 704="No"), the detector circuit may continue to monitor the first signal paths in block 702.

In response to determining that the main controller has stopped sending control signals to the ESC (i.e., determination block 704="Yes"), the detector circuit may control the auxiliary controller to take control of the associated ESC in block 706. In some embodiments, the detector circuit may control a switch (e.g., 510, 610) in block 706 to switch from the first signal path connecting the main controller with one or more ESCs to a second signal path that connects the one or more ESCs with one or more auxiliary controllers.

In block 708, the one or more auxiliary controllers may issue motor control signals to the ESCs configured to control the motors so that the robotic vehicle enters a safe mode of operation. Examples of limited safe modes operation include hovering for an aerial robotic vehicle, slowly ascending for a submersible robotic vehicle, or holding the last known steering angle for an autonomous road robotic vehicle.

In block 710, the detector circuit may determine whether the main controller is capable of resuming control of the ESC. In some embodiments, the detector circuit may determine whether the main controller is capable of resuming sending valid control signals to the ESC. For example, the detector circuit may determine when the main controller has completed a process of rebooting, or that the main controller has come back online. In some embodiments, the detector circuit may detect motor control signals from the main controller.

In response to determining that the main controller is not capable of resuming control of the ESC (i.e., determination block 710="No"), the one or more auxiliary controllers may continue to issue motor control signals to the ESCs in block 708. In some embodiments, the detector circuit may maintain the connection of the second signal path in response to determining that the main controller is not capable of resuming control of the ESC.

In response to determining that the main controller is capable of resuming control of the ESC (i.e., determination block 710="Yes"), the detector circuit may control the one or more auxiliary controllers to relinquish control of each associated ESC to the main controller. In some embodiments, in response to determining that the main controller is capable of resuming control of the ESC, the detector circuit may disconnect the second signal path and reconnect the first signal path between the main controller and each ESC.

The processor may continue to monitor the first signal paths in block 702.

Figure 8:
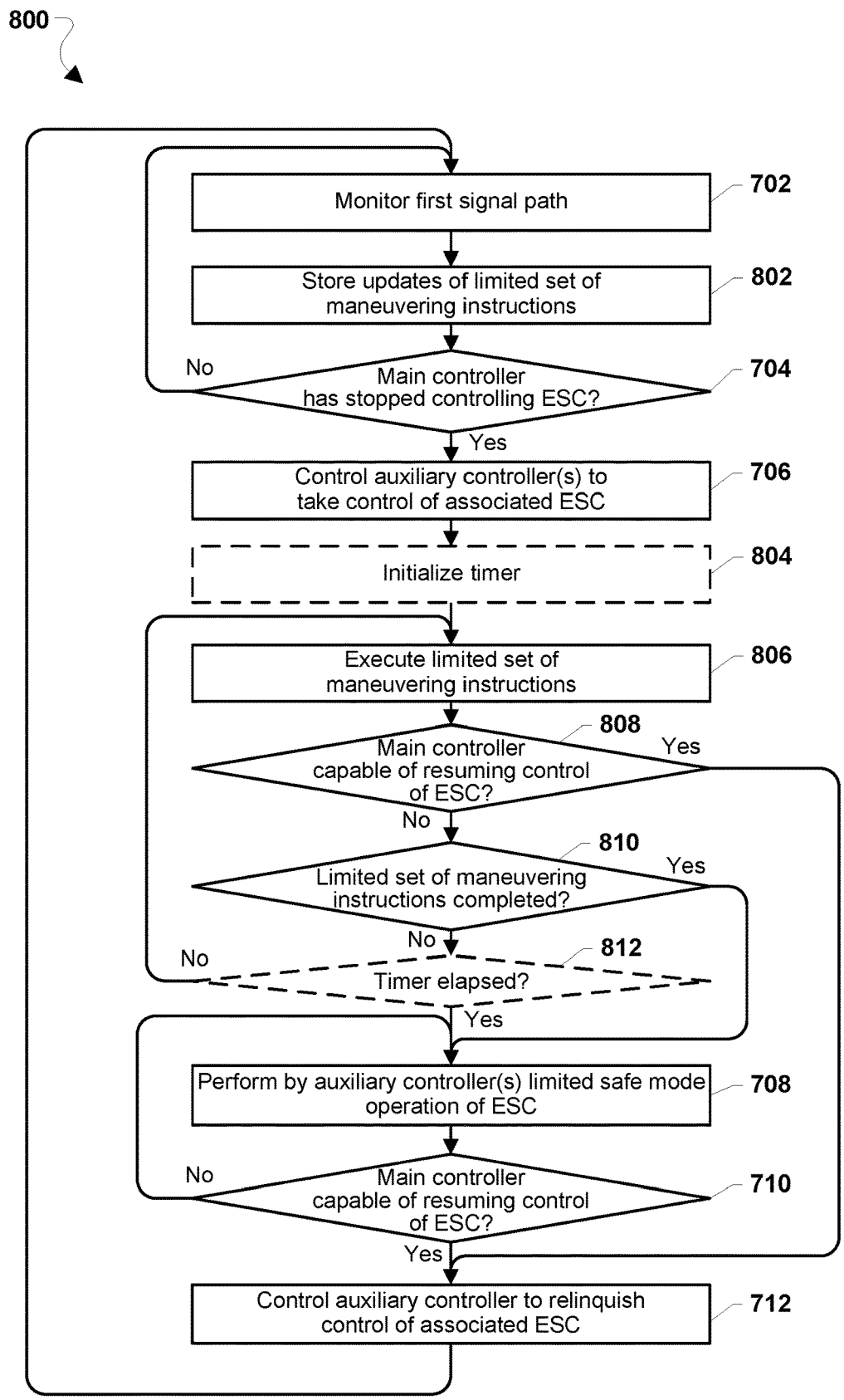
FIG. 8 is a process flow diagram illustrating a method of managing operations of a robotic vehicle according to various embodiments.

FIG. 8 illustrates a method 800 of managing operations of a robotic vehicle according to various embodiments. With reference to FIGS. 1-8, the method 800 may be implemented in hardware components and/or software components of the robotic vehicle (e.g., 102, 200), the operation of which may be controlled by one or more processors (e.g., the controller 220, 504, 604 and/or the like) of the robotic vehicle. In blocks 702-712, the processor of the robotic vehicle may perform operations of like-numbered blocks of the method 700 as described.

In block 802, an auxiliary controller (e.g., 504, 604) may receive and store periodic updates of a limited set of motor control instructions from a main controller (e.g., 220). In some embodiments, the limited set of motor control instructions may be instructions for a relatively short period of time (e.g., instructions for approximately 10-15 seconds). In some embodiments, the limited set of motor control instructions may include a set of two or more motor control instructions. In some embodiments, the limited set of motor control instructions may include motor controls that will cause the robotic vehicle to perform optional maneuvers, such as maneuvers to be performed in response to determining a particular environmental condition and/or condition of the robotic vehicle. The limited set of motor control instructions may be stored in a memory associated with the auxiliary controller.

In optional block 804, after one or more auxiliary controllers begins issuing motor control signals to the ESC in block 706, the processor may initialize a timer, which may be used as further described below.

In block 806, the auxiliary controller(s) may execute the small set of motor control instructions to generate and issue motor control signals to the ESC.

In determination block 808, the detector circuit may determine whether the main controller is capable of resuming control of the ESC.

In response to determining that the main controller is capable of resuming control of the ESC (i.e., determination block 808="Yes"), the detector circuit may control the auxiliary controller to relinquish control of the associated ESC in block 712.

In response to determining that the main controller is not capable of resuming control of the ESC (i.e., determination block 808="No"), the auxiliary controller may determine whether the limited set of motor control instructions has been completed in determination block 810.

In response to determining that the small set of motor control instructions has not been completed (i.e., determination block 810="No"), the auxiliary controller may determine whether the timer has elapsed in optional determination block 812.

In response to determining that the timer has not elapsed (i.e., optional determination block 812="No"), the auxiliary controller may continue to execute the limited set of motor control instructions in block 806.

In response to determining that the limited set of motor control instructions has been completed (i.e., determination block 810="Yes"), or in response to determining that the timer has elapsed in optional determination block 812 (i.e., optional determination block 812="Yes"), the auxiliary controller may begin issuing motor control signals to the ESC(s) in block 708 that cause the robotic vehicle to perform a limited safe mode of operations.

Figure 9:
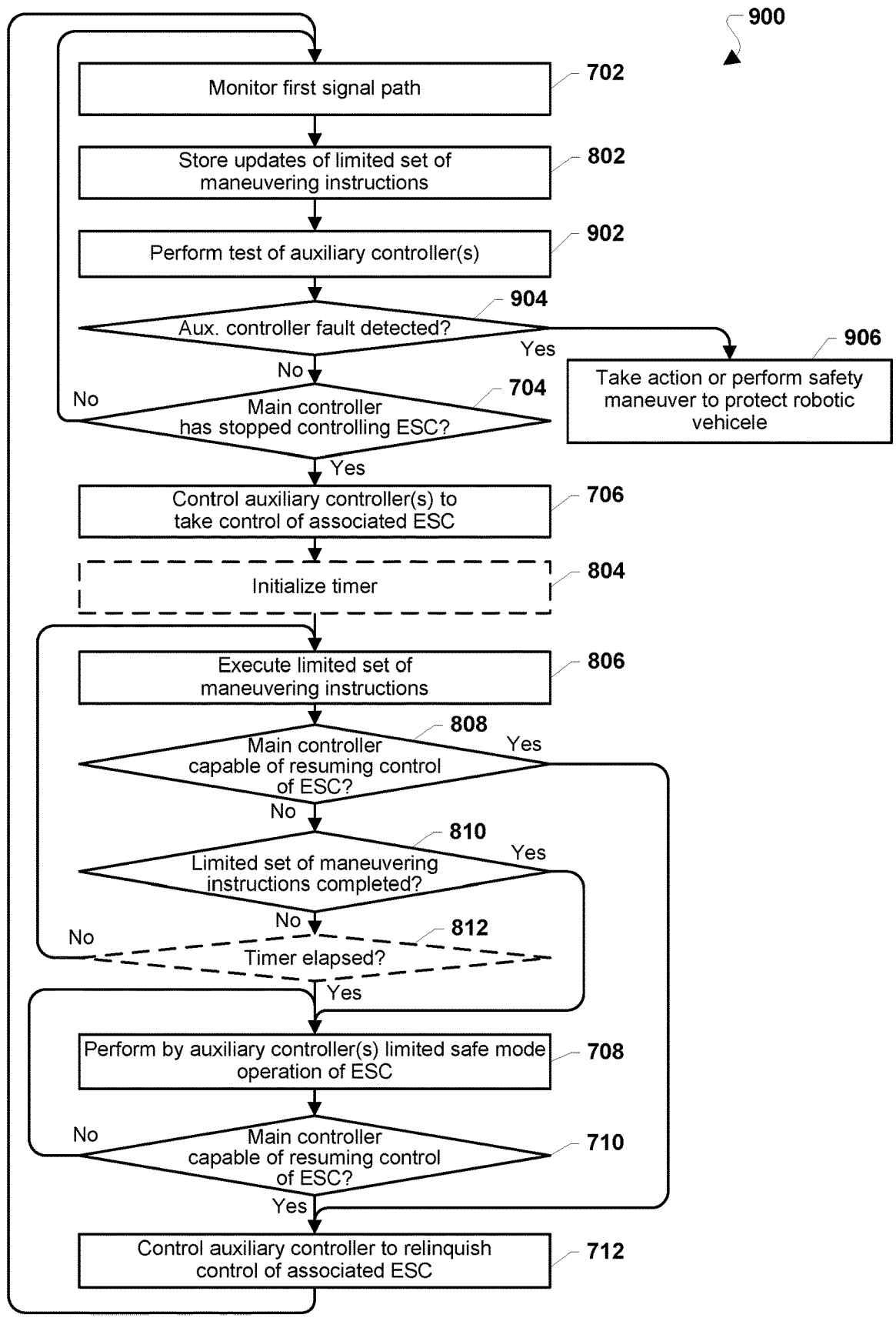
FIG. 9 is a process flow diagram illustrating a method of managing operations of a robotic vehicle according to various embodiments.

FIG. 9 illustrates a method 900 of managing operations of a robotic vehicle according to various embodiments. With reference to FIGS. 1-9, the method 900 may be implemented in hardware components and/or software components of the robotic vehicle (e.g., 102, 200), the operation of which may be controlled by one or more processors (e.g., the controller 220, 504, 604 and/or the like) of the robotic vehicle. In blocks 702-712 and 802-812, the processor of the robotic vehicle may perform operations of like-numbered blocks of the methods 700 and 800 as described.

In various embodiments, a processor of the robotic vehicle may test the operation of the various auxiliary controller(s) (e.g., 504, 604) from time to time, and may take an action or perform a maneuver to protect the robotic vehicle in the event that an auxiliary controller fault is detected. Detecting a fault in an auxiliary controller may indicate that the robotic vehicle is vulnerable (e.g., could crash) in the event that the main controller fails or initiates a reboot. Thus, testing auxiliary controllers for their functionality may be performed as part of pre-flight testing and/or periodically during operation as part of ensuring safe operation of the robotic vehicle.

In block 902, the auxiliary controller(s) and/or a main controller (e.g., 220) may perform a test of the auxiliary controller(s) configured to determine whether each auxiliary controller is or is capable of functioning properly. For example, such a test may involve signaling and/or analysis of responses to determine whether one or more parameters of the auxiliary controller meets a threshold level of performance and/or criteria indicative of proper functioning. For example, the auxiliary controller may send a test signal to the main controller and, based on the test signal from the auxiliary controller, the main controller may determine whether the auxiliary controller is functioning properly. In some embodiments, in response to a test signal from an auxiliary controller, the main controller may send a responsive signal, and based on the responsive signal the auxiliary controller may determine whether it is functioning properly. As another example, the main controller may send a test signal to the auxiliary controller. In some embodiments, based on the test signal from the main controller, the auxiliary controller may determine whether it is or is capable of functioning properly. In some embodiments, in response to a test signal from the main controller, the auxiliary controller may send a responsive signal, and based on the responsive signal the main controller may determine whether the auxiliary controller is or is capable of functioning properly.

In determination block 904, the processor of the robotic vehicle (e.g., the main controller and/or the auxiliary controller) may determine whether an auxiliary controller fault is detected.

In response to determining that an auxiliary controller fault is not detected (i.e., determination block 904="No"), the operations of determination block 704 of the method 700 may be performed as described.

In response to detecting an auxiliary controller fault (i.e., determination block 904="Yes"), the processor may cause the robotic vehicle to take an action or perform a safety maneuver to protect the robotic vehicle in block 906. As examples of a safety maneuver, an aerial robotic vehicle may land if the fault is detected while in flight, a submersible robotic vehicle may surface, and a land robotic vehicle may maneuver to a safe location (e.g., to the side of a road). As another example of a safety maneuver, any type of robotic vehicle may return to a base. As a further example, operation of the robotic vehicle may be inhibited if the fault is detected during a pre-operation test.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 700 and 800 may be substituted for or combined with one or more operations of the methods 700 and 800, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for maintaining control of a robotic vehicle when control signals from a main controller are lost, comprising:
   monitoring, by a detector circuit, control signals from a main controller of the robotic vehicle to an electronic speed controller (ESC) to detect a loss of valid control signals to the ESC; and
   causing an auxiliary controller to begin issuing motor control signals to the ESC for controlling one or more motors to maintain control of the robotic vehicle in response to detecting a loss of valid control signals to the ESC, wherein issuing, by the auxiliary controller, motor control signals to the ESC for controlling one or more motors to maintain control of the robotic vehicle comprises:
      executing a set of motor control instructions for issuing motor control signals to the ESC for controlling one or more motors to cause the robotic vehicle to perform a maneuver;
      determining whether the set of motor control instructions have been completed; and
      issuing motor control signals to the ESC for controlling one or more motors to cause the robotic vehicle to assume a safe mode of operation in response to determining that the set of motor control instructions has been completed.

2. The method of claim 1, wherein causing an auxiliary controller to begin issuing motor control signals to the ESC in response to detecting loss of valid control signals from the main controller to the ESC comprises disconnecting a first signal path that couples the main controller to the ESC and connecting a second signal path that couples the auxiliary controller to the ESC.

3. The method of claim 1, further comprising:
   determining whether the main controller is capable of resuming sending valid control signals to the ESC; and
   causing the auxiliary controller to stop sending motor control signals to the ESC in response to determining that the main controller is capable of resuming sending valid control signals to the ESC.

4. The method of claim 3, wherein determining whether the main controller is capable of resuming sending valid control signals to the ESC comprises detecting that the main controller has completed a reboot process.

5. The method of claim 1, wherein the auxiliary controller is configured by motor control instructions stored in memory to issue motor control signals to the ESC for controlling one or more motors to maintain control of the robotic vehicle.

6. The method of claim 5, wherein the motor control instructions stored in the memory configure the auxiliary controller to issue motor control signals to the ESC for controlling one or more motors to cause the robotic vehicle to assume a safe mode of operation.

7. The method of claim 5, further comprising:
   receiving, by the auxiliary controller, motor control instructions from the main controller prior to the loss of valid control signals; and
   storing, by the auxiliary controller, the received motor control instructions in the memory.

8. The method of claim 7, wherein the motor control instructions received from the main controller configure the auxiliary controller to issue motor control signals to the ESC for controlling one or more motors to cause the robotic vehicle to maintain an attitude, direction, or speed of the robotic vehicle prior to the loss of valid control signals.

9. The method of claim 1, further comprising:
   performing a test of the auxiliary controller;
   determining whether a fault in the auxiliary controller is detected; and
   taking an action to protect the robotic vehicle in response to detecting a fault in the auxiliary controller.

10. The method of claim 1, further comprising:
    initializing a timer upon detecting a loss of valid control signals to the ESC;
    determining whether the timer has elapsed in response to determining that the set of motor control instructions have not been completed; and
    issuing motor control signals to the ESC for controlling one or more motors to cause the robotic vehicle to assume a safe mode of operation in response to determining that the timer has elapsed.

11. A robotic vehicle, comprising:
    a motor;
    an electronic speed controller (ESC) coupled to a motor;
    a main controller coupled to the ESC;
    a detector circuit configured to monitor control signals from the main controller to the ESC to detect a loss of valid control signals to the ESC; and
    an auxiliary controller configured to issue motor control signals to the ESC for controlling the motor to maintain control of the robotic vehicle in response to a detection by the detector circuit of a loss of valid control signals from the main controller to the ESC, wherein the auxiliary controller is further configured to:
   execute a set of motor control instructions for issuing motor control signals to the ESC for controlling the motor to cause the robotic vehicle to perform a maneuver;
   determine whether the set of motor control instructions have been completed; and
   issue motor control signals to the ESC for controlling one or more motors to cause the robotic vehicle to assume a safe mode of operation in response to determining that the set of motor control instructions has been completed.

12. The robotic vehicle of claim 11, wherein the auxiliary controller is a component within the ESC.

13. The robotic vehicle of claim 11, further comprising a switch connected to the detector circuit and the auxiliary controller and configured to disconnect a first signal path that couples the main controller to the ESC and connect a second signal path that couples the auxiliary controller to the ESC to cause the auxiliary controller to begin issuing the motor control signals to the ESC in response to a detection by the detector circuit of a loss of valid control signals from the main controller to the ESC.

14. The robotic vehicle of claim 11, wherein the detector circuit is further configured to determine whether the main controller is capable of resuming sending valid control signals to the ESC.

15. The robotic vehicle of claim 14, further comprising a switch connected to the detector circuit and the auxiliary controller and configured to disconnect a signal path that couples the auxiliary controller to the ESC to cause the auxiliary controller to stop sending motor control signals to the ESC and to connect a signal path that couples the main controller to the ESC in response to a determination by the detector circuit that the main controller is capable of resuming sending valid control signals to the ESC.

16. The robotic vehicle of claim 14, wherein the detector circuit is further configured to determine that the main controller is capable of resuming sending valid control signals to the ESC in response to detecting that the main controller has completed a reboot process.

17. The robotic vehicle of claim 11, wherein the auxiliary controller is configured by motor control instructions stored in memory to issue motor control signals to the ESC for controlling one or more motors to maintain control of the robotic vehicle.

18. The robotic vehicle of claim 17, wherein the motor control instructions stored in the memory configure the auxiliary controller to issue motor control signals to the ESC for controlling one or more motors to cause the robotic vehicle to assume a safe mode of operation.

19. The robotic vehicle of claim 17, wherein the auxiliary controller is configured to:
   receive motor control instructions from the main controller prior to the loss of valid control signals; and
   store the received motor control instructions in the memory.

20. The robotic vehicle of claim 19, wherein the motor control instructions received from the main controller configure the auxiliary controller to issue motor control signals to the ESC for controlling one or more motors to cause the robotic vehicle to maintain an attitude, direction or speed of the robotic vehicle prior to the loss of valid control signals.

21. The robotic vehicle of claim 11, wherein the detector circuit is a component within the auxiliary controller.

22. The robotic vehicle of claim 11, wherein the auxiliary controller is further configured to:
   initialize a timer upon detecting a loss of valid control signals from the main controller to the ESC;
   determine whether the timer has elapsed in response to determining that the set of motor control instructions have not been completed; and
   issue motor control signals to the ESC for controlling one or more motors to cause the robotic vehicle to assume a safe mode of operation in response to determining that the timer has elapsed.

23. The robotic vehicle of claim 11, wherein the main controller is configured with processor-executable instructions to:
   perform a test of the auxiliary controller;
   determine whether a fault in the auxiliary controller is detected; and
   take an action to protect the robotic vehicle in response to detecting a fault in the auxiliary controller.

\* \* \* \* \*